US011246307B2

(12) United States Patent
Noe

(10) Patent No.: US 11,246,307 B2
(45) Date of Patent: Feb. 15, 2022

(54) FLAPPING WING DECOY

(71) Applicant: Tim Noe, Hudson, WI (US)

(72) Inventor: Tim Noe, Hudson, WI (US)

(73) Assignee: Expedite International, Inc., Baldwin, WI (US)

( * ) Notice: Subject to any disclaimer, the term of this patent is extended or adjusted under 35 U.S.C. 154(b) by 258 days.

(21) Appl. No.: 16/534,721

(22) Filed: Aug. 7, 2019

(65) Prior Publication Data

US 2021/0037808 A1    Feb. 11, 2021

(51) Int. Cl.
*A01M 31/06*    (2006.01)
(52) U.S. Cl.
CPC .................................. *A01M 31/06* (2013.01)
(58) Field of Classification Search
CPC .................................................... A01M 31/06
USPC .......................................................... 43/2, 3
See application file for complete search history.

(56) References Cited

U.S. PATENT DOCUMENTS

| | | | |
|---|---|---|---|
| 6,170,188 B1 * | 1/2001 | Mathews | ............... A01M 31/06 43/3 |
| 6,408,559 B2 | 6/2002 | Mathews | |
| 6,442,884 B1 | 9/2002 | Sceery | |
| 6,493,980 B1 | 12/2002 | Richardson et al. | |
| 8,188,691 B1 | 5/2012 | Twohig | |
| 10,638,747 B2 * | 5/2020 | Noe | ..................... G01G 19/022 |
| 2005/0252066 A1 | 11/2005 | Couvillion, III | |
| 2009/0165353 A1 | 7/2009 | Priest et al. | |
| 2016/0235053 A1 | 8/2016 | Koenck | |
| 2018/0192638 A1 * | 7/2018 | Denmon | ............... A01M 31/06 |

* cited by examiner

*Primary Examiner* — Peter M Poon
*Assistant Examiner* — Danielle A Clerkley
(74) *Attorney, Agent, or Firm* — Skinner and Associates; Joel D. Skinner, Jr.

(57) ABSTRACT

A flapping wing water fowl or migratory bird decoy set is disclosed. The decoy set includes a decoy and a mounting base. The decoy includes a body, a pair of wings, a motor assembly, a battery, and a waterproof control module. An exemplary bird is a goose. The body is constructed of a predetermined plastic material with hyper-realistic exterior ornamentation, and is arranged in a predetermined orientation to simulate a goose. The decoy has a pair of flappable decoy wings connected to the decoy body, the decoy wing being constructed and arranged to simulate the wing of a waterfowl or migratory bird. The control and power module is plug and play software controllable. The decoy is mountable on a male type member post via a female type receptacle on the decoy body. The decoy has a biased stabilizer cord that also mimics the legs of the waterfowl or migratory bird. The motor is mechanically coupled to the wings via a belt drive arrangement which yields a quiet decoy.

18 Claims, 19 Drawing Sheets

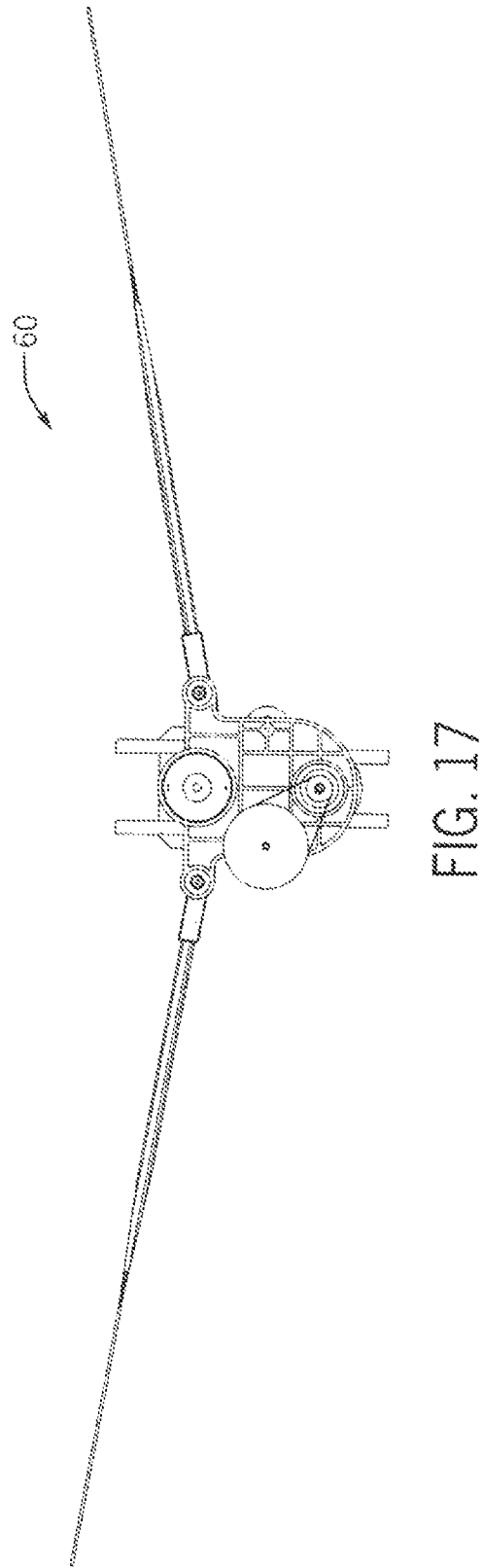

FLAPPING WING DECOY

CROSS-REFERENCE TO RELATED APPLICATIONS IF ANY

This application claims the benefit under 35 U.S.C. § 119(e) of co-pending U.S. Provisional Patent Application Ser. No. 62/715,358, filed Aug. 7, 2018, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field

The present invention relates, generally, to hunting systems, apparatus and methods. More particularly, the invention relates to a decoy apparatus and method. Most particularly, the invention relates to a spinning or flapping wing decoy that is constructed and arranged to realistically resemble a waterfowl or other migrating bird, such as a goose, that has a removable control and power module which is disposed on the bottom of the decoy, which is plug and play electronic controllable, which is mountable on a post via a female type receptacle, and which has a biased stabilizer that also mimics the legs of the goose.

2. Background Information

Decoys have been used for centuries to imitate an animal such as a bird for the purpose of attracting other birds or animals to a particular location for hunting or other purposes. Modern waterfowl decoys come in many types, including floating, ground placed, and stake or base mounted. Decoy bodies may have fixed wings or movable wings. Movable wings may be spinning, flapping or the like. And movable wings may be actuated by motor power, by wind, or by other forces. Many waterfowl decoys are constructed of inexpensive plastic materials.

Existing decoys are believed to have significant limitations and shortcomings. One problem is that the mechanical operation of decoy components, such as a motor that flaps the wings, can produce loud, unnatural noises, which degrades the quality of the imitation. Another problem for motorized moving wing decoys is that the power and motor mechanisms disposed inside decoy bodies are accessed through a cover or door placed on the top of the decoy body. This exposes the power and motor mechanisms to moisture from rain, other precipitation, wave action, and the like, and to dust and dirt in the environment. Another problem with top mounted access panels is that they present break lines that degrade the quality of the imitation body features of the decoy species. This is particularly a problem for bodies constructed of commonly used plastics. Commonly used plastics, although inexpensive to use, limit the quality of imitation ornamentation. Other problems exist with respect to mounting of decoys on stakes or other bases, and to inferior control mechanisms and features, particularly remote control features. For these and other reasons, a need exists for the present invention.

All US patents and patent applications, and all other published documents mentioned anywhere in this application are hereby incorporated by reference in their entirety.

BRIEF SUMMARY

The present invention provides a waterfowl or migratory bird decoy for hunting purposes, and methods of manufacture and use therefore, which are practical, effective, reliable, and efficient, and which are believed to fulfill a need and to constitute an improvement over the background technology. One improvement is a reduction of noise through the use of a belt-driven assembly.

In one aspect, the invention provides a water fowl or migratory bird decoy including, a decoy body constructed of a predetermined material with exterior ornamentation to simulate a waterfowl or migratory bird, the decoy body being arranged in a predetermined orientation to simulate a waterfowl or migratory bird, the decoy body having a top and a bottom;

at least one decoy wing connected to the decoy body, the decoy wing being constructed and arranged to simulate the wing of a waterfowl or migratory bird;

a drive assembly including a motor and a belt drive mechanism coupling the motor to at least one decoy wing, and a power and control module, the power and control module being connectible and disconnectible from the bottom of the decoy body, the power and control module actuating the decoy wing.

In another aspect, the invention provides A decoy set including, a decoy; and a decoy base adapted to be placed on an environmental surface, the decoy base adapted to hold the decoy in a predetermined position, the decoy being connectible and disconnectible from the decoy base;

the decoy including a decoy body constructed of a predetermined material, the decoy body being arranged in a predetermined orientation to simulate a bird, the decoy body having a top and a bottom, at least one decoy wing connected to the decoy body, the decoy wing being constructed and arranged to simulate the wing of a bird, a drive assembly including a motor and a belt drive mechanism coupling the motor to at least one decoy wing, and a power and control module, the power and control module being connectible and disconnectible from the bottom of the decoy body, the power and control module being communicatively connected to the motor.

In still another aspect, the invention provides a waterfowl or migratory bird decoy set including, a powered, flapping wing decoy;

a decoy base post adapted to be placed on an environmental surface, the decoy base adapted to hold the decoy in a predetermined position, the decoy being connectible and disconnectible from the decoy base, the decoy base including a vertical member, a male type connector disposed at the top of the decoy base, and a horizontal member connected to the vertical member a predetermined distance from the top of the vertical member thereby forming a T-shaped handle;

the decoy including,
a decoy body constructed of ethylene vinyl acetate with exterior ornamentation to simulate a waterfowl or migratory bird, the decoy body being arranged in a predetermined orientation to simulate a waterfowl or migratory bird, the decoy body having a top, a bottom, and an interior cavity, the interior cavity being open at the bottom to form an access cavity port,
a pair of flappable decoy wings extending laterally from the decoy body, each decoy wing including a mating shaft and a wing panel which is constructed and arranged to simulate the wing of a waterfowl or migratory bird,
a drive assembly disposed in the interior cavity of the decoy body, the drive assembly including a motor and a belt drive mechanism coupling the motor to the mating shafts off the pair of flappable decoy wings, and
a power and control module, the power and control module being connectible and disconnectible tom the bottom of the decoy body at the access cavity port, the power and control module including a battery communicatively connected to an electronic control circuit the electronic control circuit further being communicatively connected to the motor assembly; and whereby in use, the decoy base is placed in a selected position in a hunting environment by a user, the lapping wing decoy is coupled to the top of the decoy base, the decoy wings are coupled to the belt drive mechanism, and the power and control module is actuated to power and flap the wings.

The belt drive assembly may include a mounting bracket connected to the interior cavity of the decoy body for holding the motor in place, a first belt coupling a first gear, connected to a drive shaft of the motor, to a second gear, a second belt communicatively coupling the second gear to pair of identical final gears, the final gears being coupled to each other by a third belt, each final gear being coupled to a drive arm which is connectible to and oscillatingly moves each decoy wing. The second belt may be coupled to the second gear by a third gear connected to the second gear by a shaft and the second belt is coupled to one final gear by a fourth gear, which is connected to the one final gear by a shaft. Each drive arm may be connected to the periphery of the final gear. And, each drive arm may comprise interconnected first and second drive arms, each such second drive arm being pivotally fixed at an distal end thereof to the mounting bracket.

The aspects, features, advantages, benefits and objects of the invention will become clear to those skilled in the art by reference to de following description, claims and drawings.

BRIEF DESCRIPTION OF THE SEVERAL VIEWS OF THE DRAWING

FIG. 17 is a back view of the interconnected wings and drive assembly.

DETAILED DESCRIPTION

Figure 1:
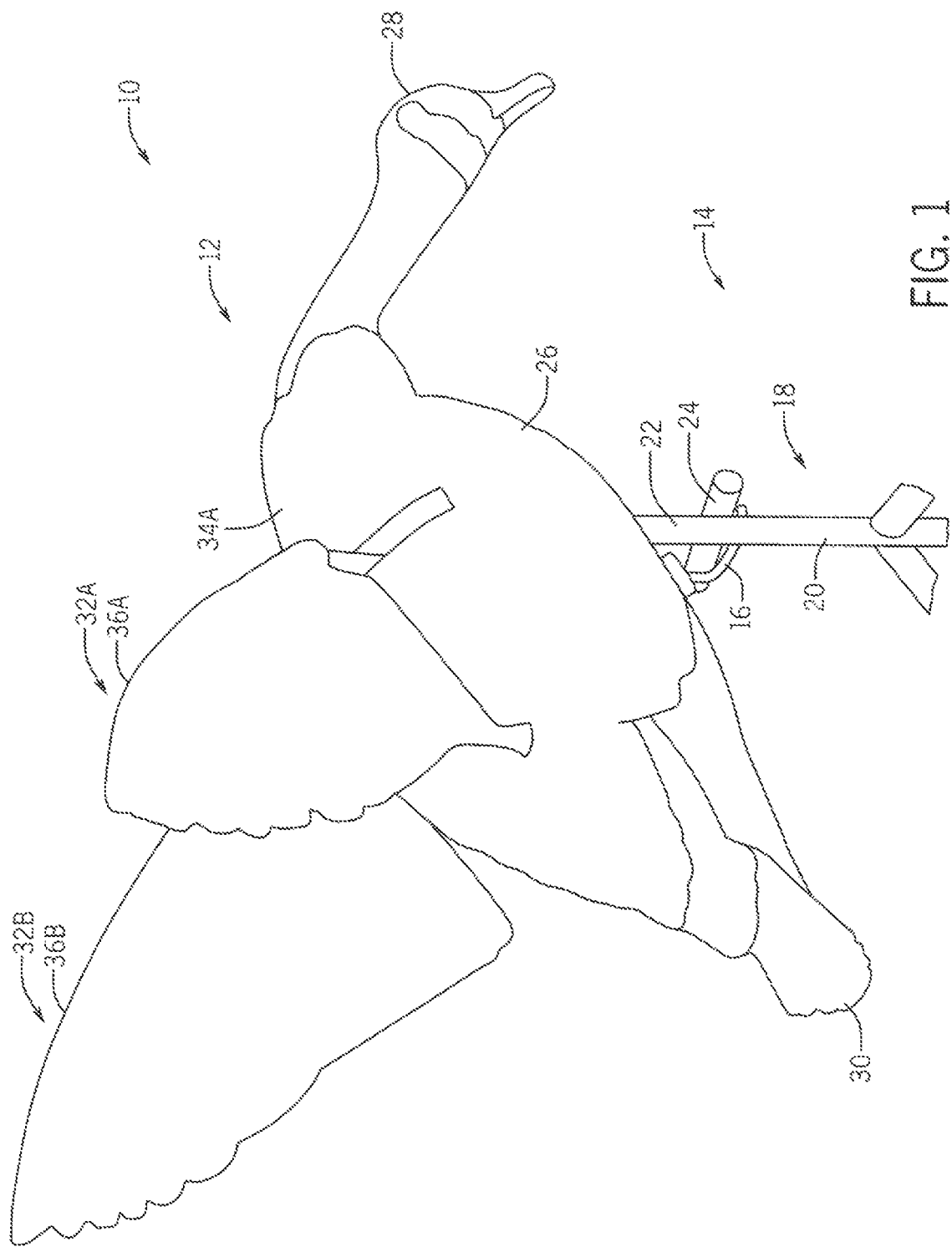
FIG. 1 is a perspective view of an embodiment of the flapping wing decoy set of the present invention.
Figure 2:
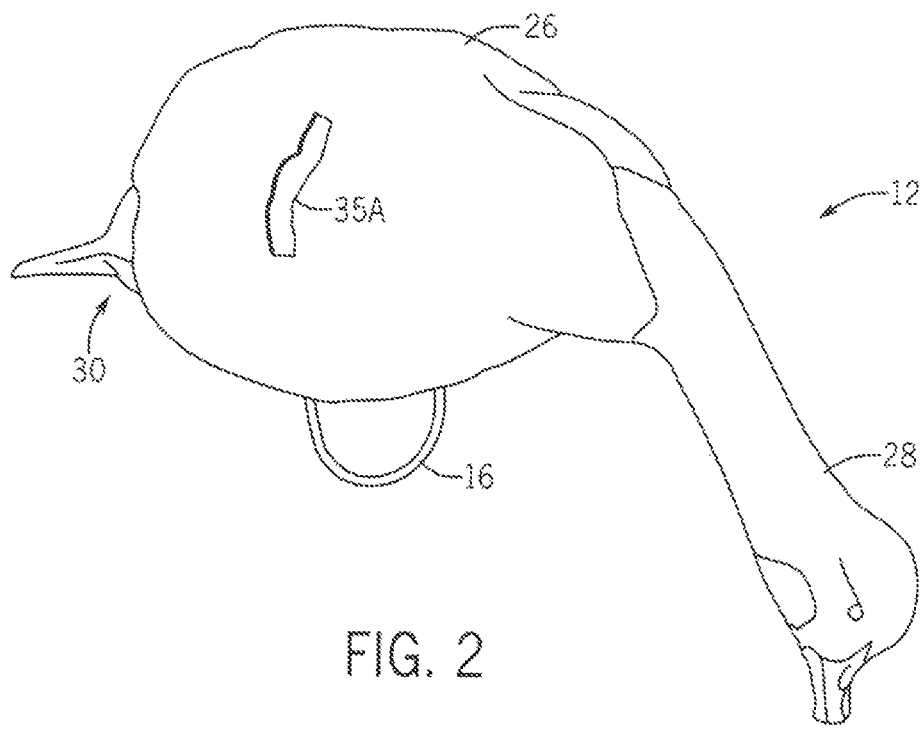
FIG. 2 is a perspective view, from the top front, of an embodiment the decoy (with wings removed) of the decoy set.
Figure 3:
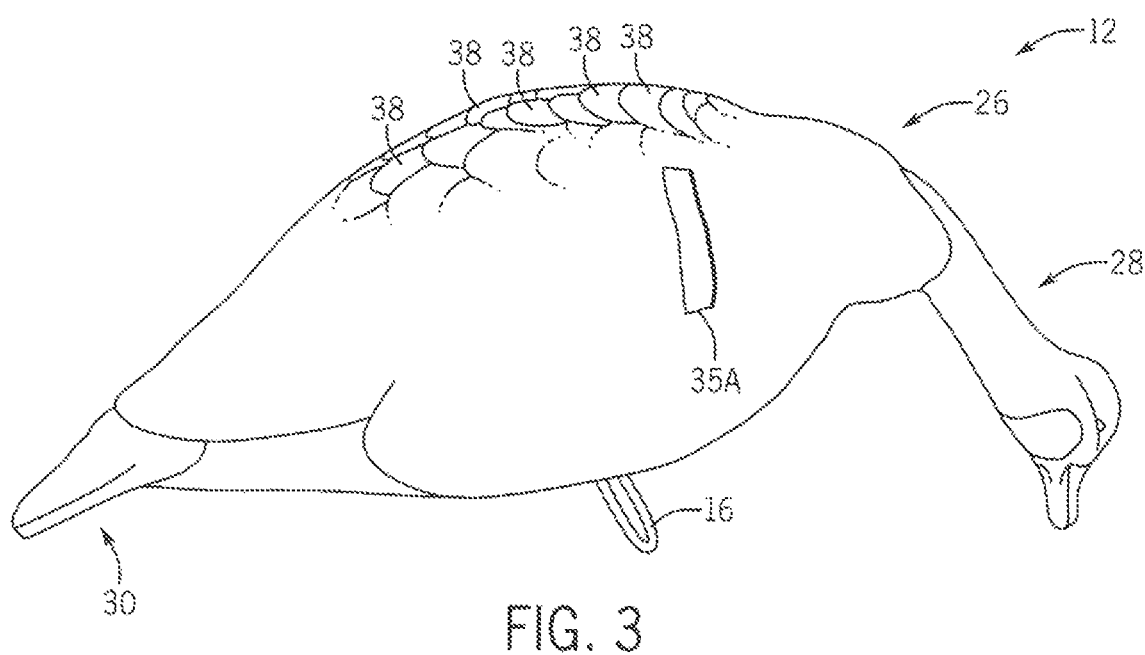
FIG. 3 is a side elevation view of the decoy.
Figure 5:
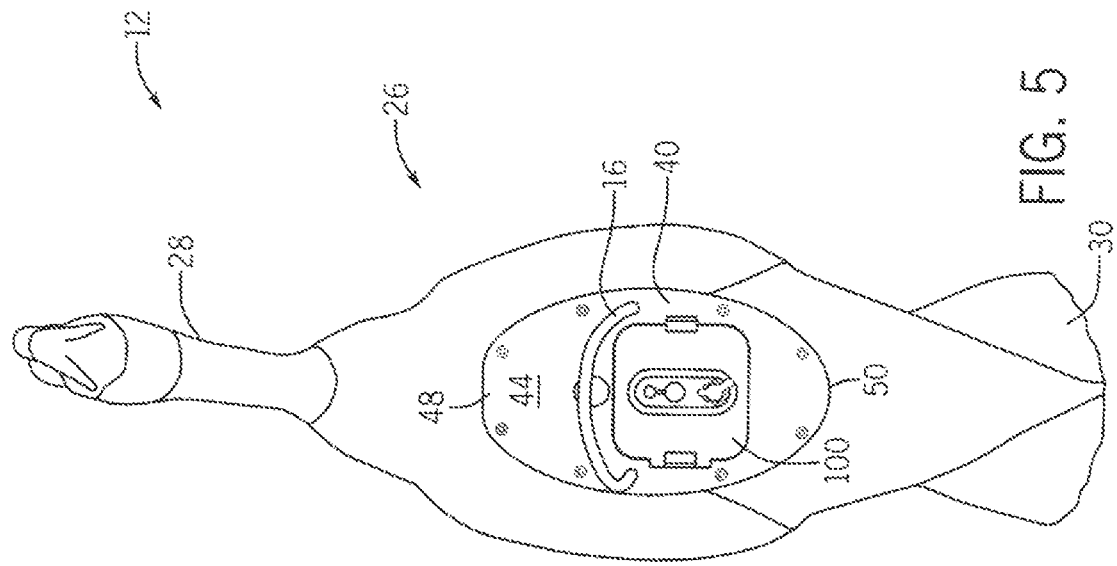
FIG. 5 is a bottom view of the decoy.
Figure 4:
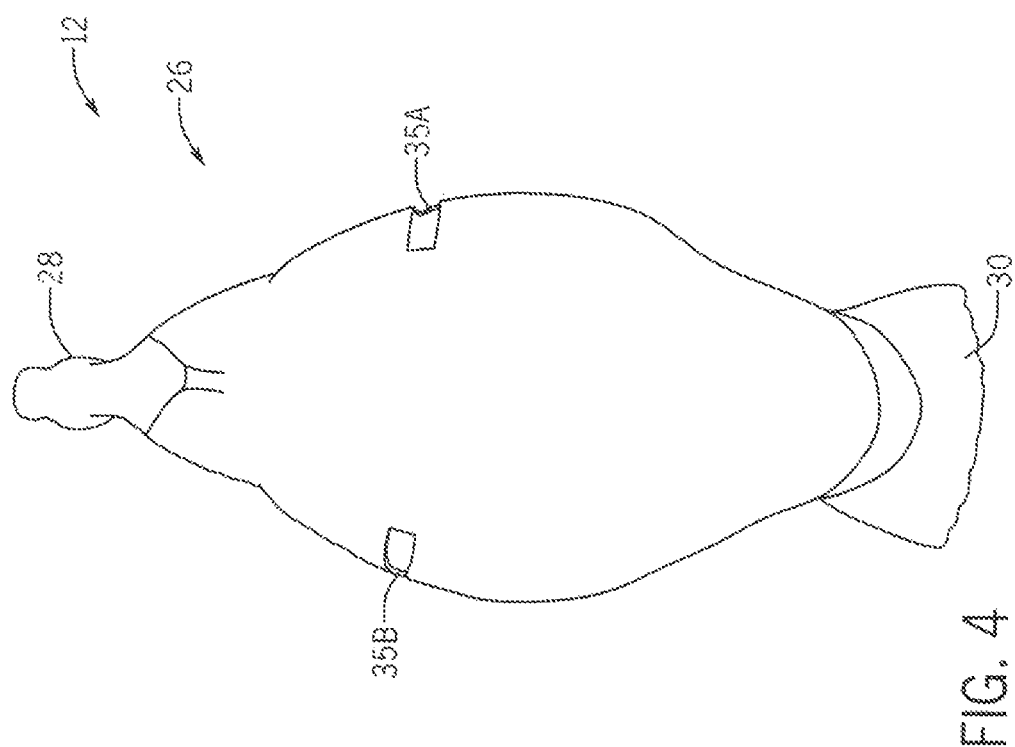
FIG. 4 is a top view of the decoy.
Figure 7:
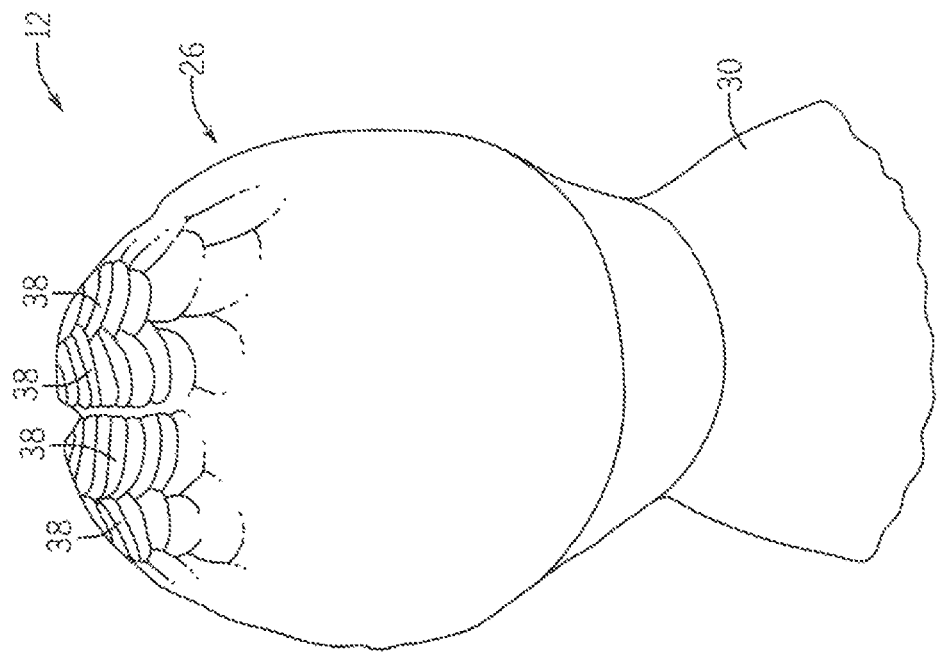
FIG. 7 is a back end view of the decoy.
Figure 6:
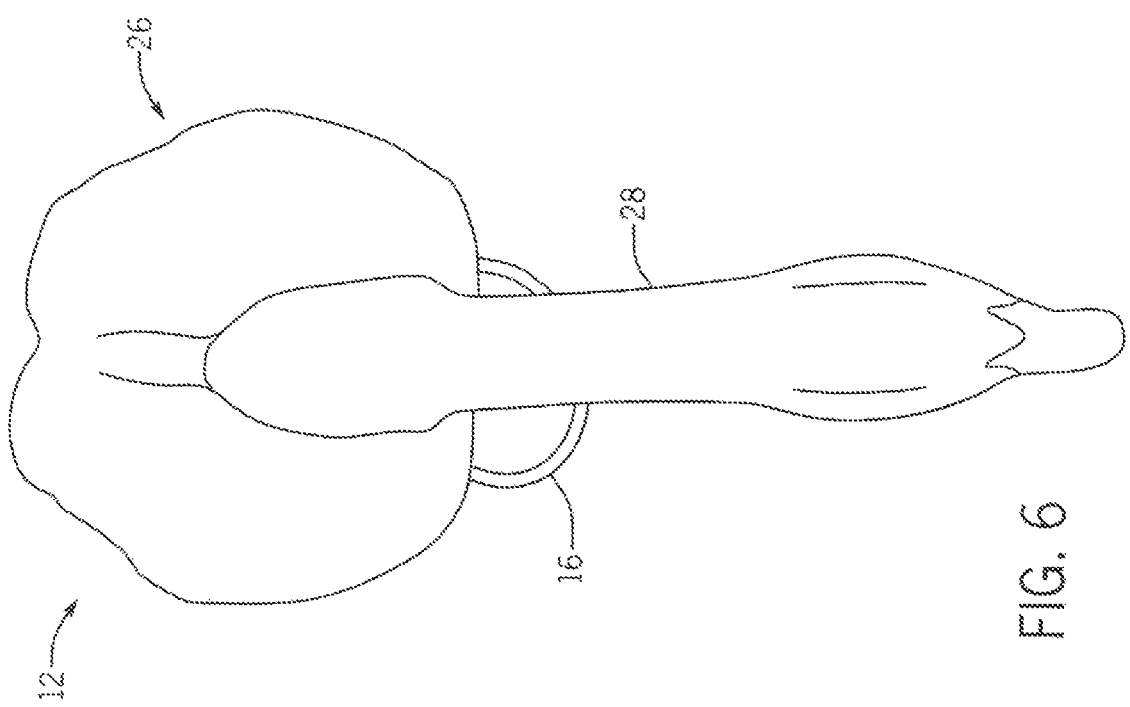
FIG. 6 is a front end view of the decoy.
Figure 8:
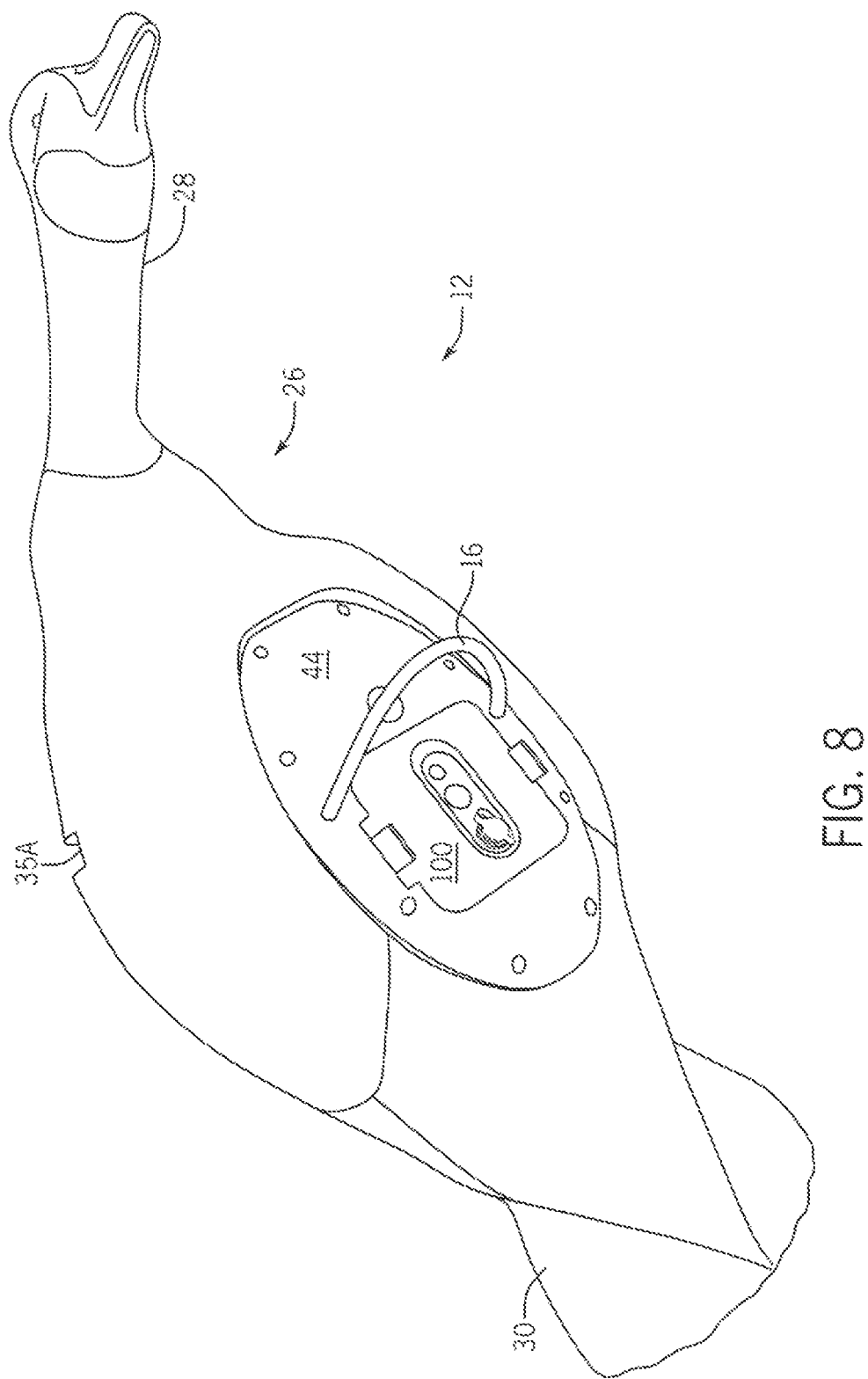
FIG. 8 is a perspective view, from below, of the decoy.
Figure 9:
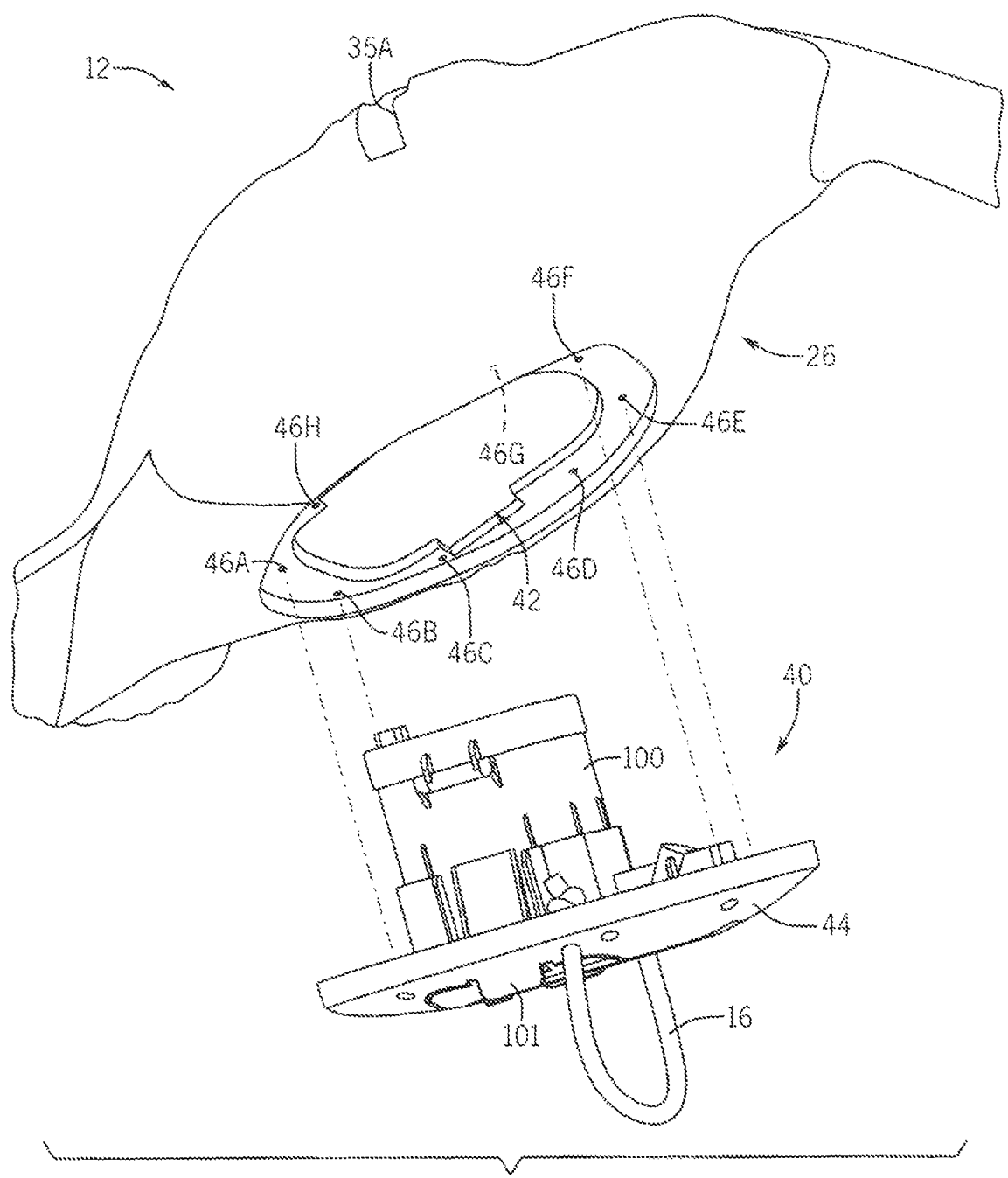
FIG. 9 is an exploded of the decoy, showing an embodiment of a power and control module separated from the body of the decoy, and showing a bottom accessible internal cavity of the body.
Figure 10:
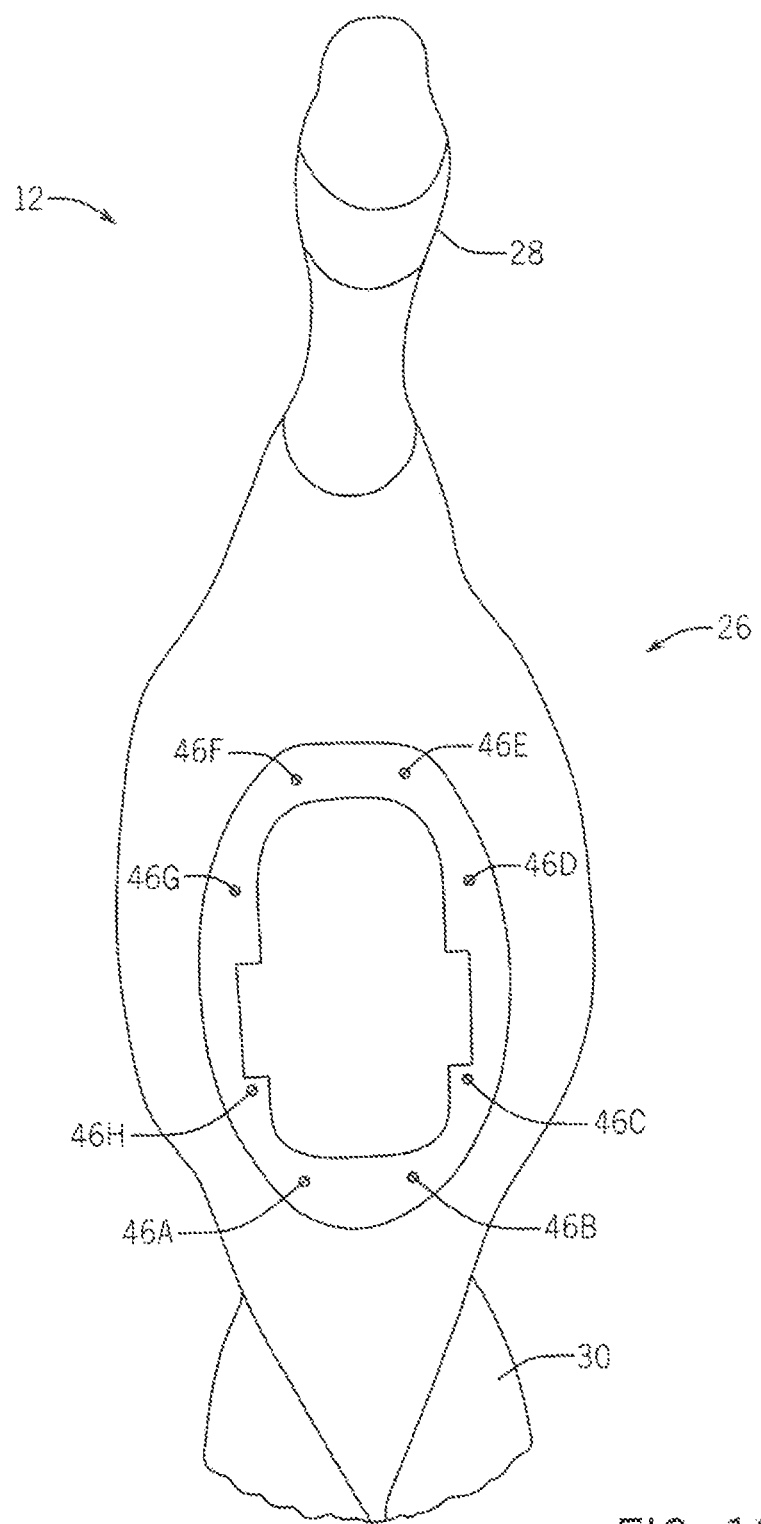
FIG. 10 is a bottom view of the body with the power and control module separated to further show the internal cavity of the body.
Figure 11:
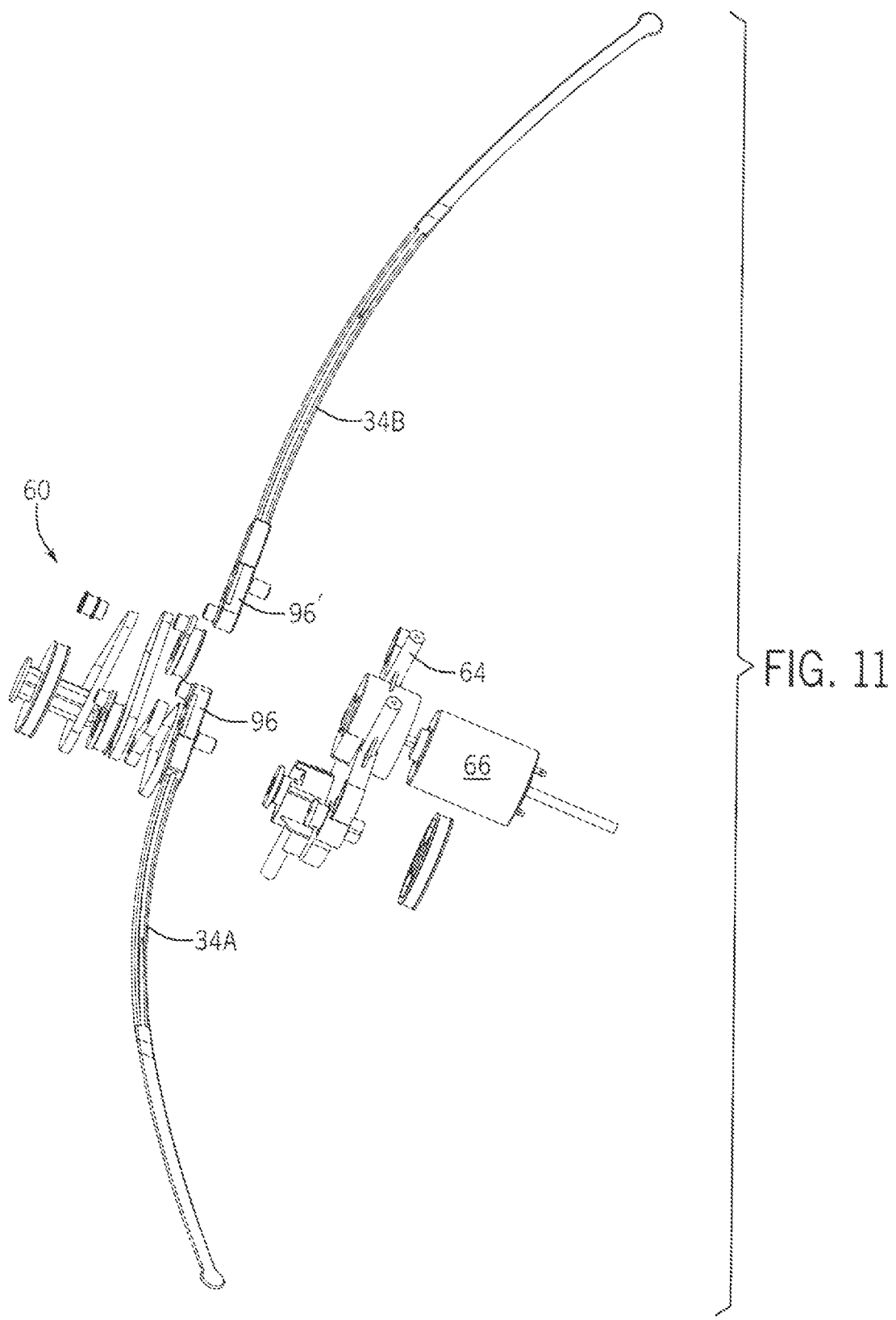
FIG. 11 is an exploded view of an embodiment of the wings of the decoy and an embodiment of internal drive assembly of the decoy.
Figure 12:
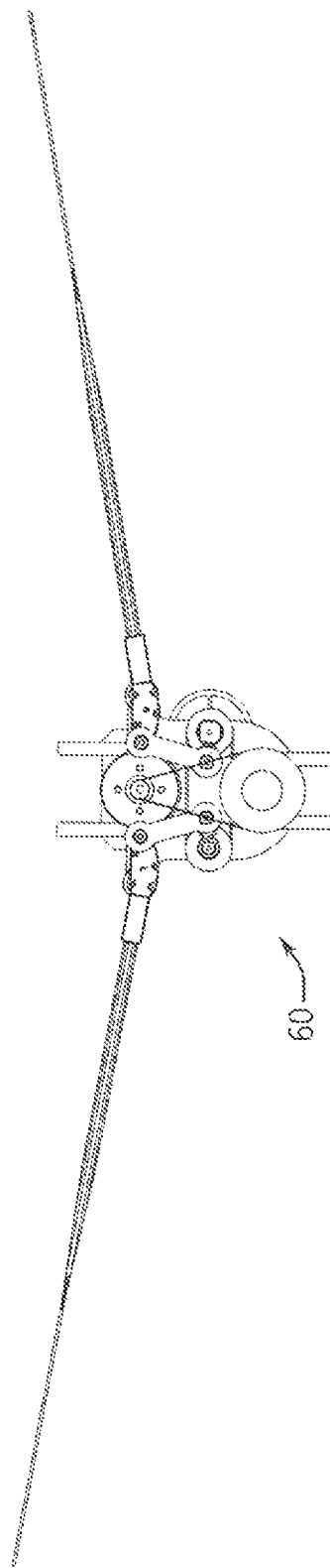
FIG. 12 is a front view of the wings in an initial, un-actuated orientation, interconnected to the drive assembly.
Figure 13:
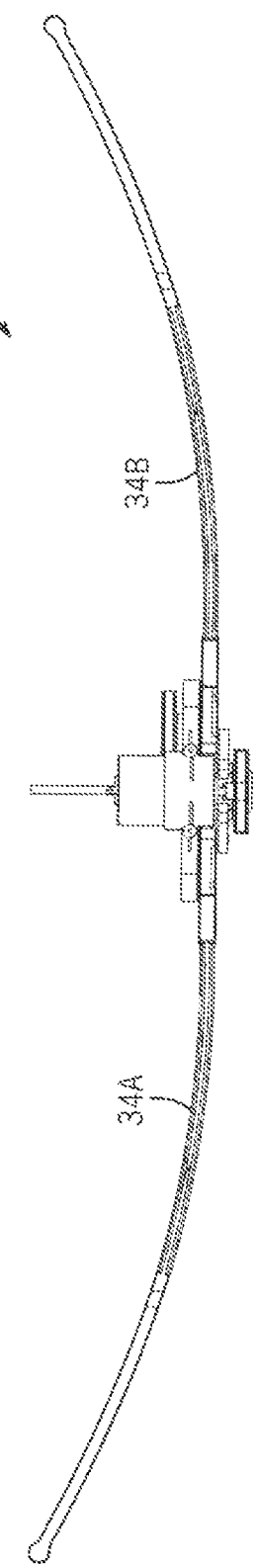
FIG. 13 is a top view of the interconnected wings and drive assembly.
Figure 14:
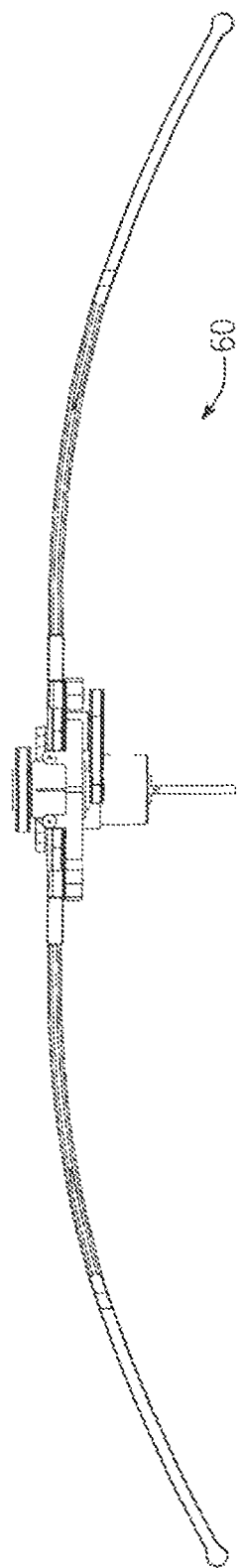
FIG. 14 is a bottom of the interconnected wings and drive assembly.
Figure 16:
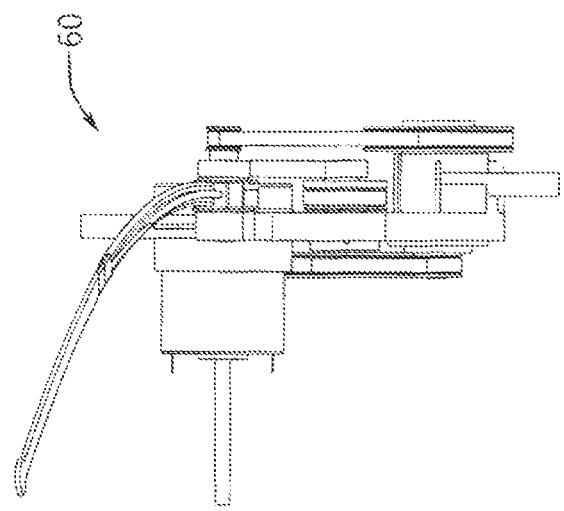
FIG. 16 is a left side view of the interconnected wings and drive assembly.
Figure 15:
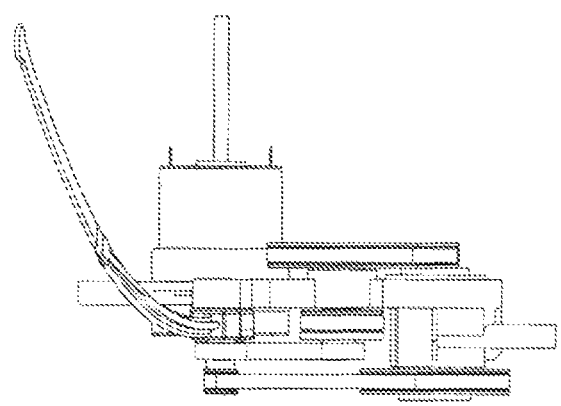
FIG. 15 is a right side view of the interconnected wings and drive assembly.
Figure 18:
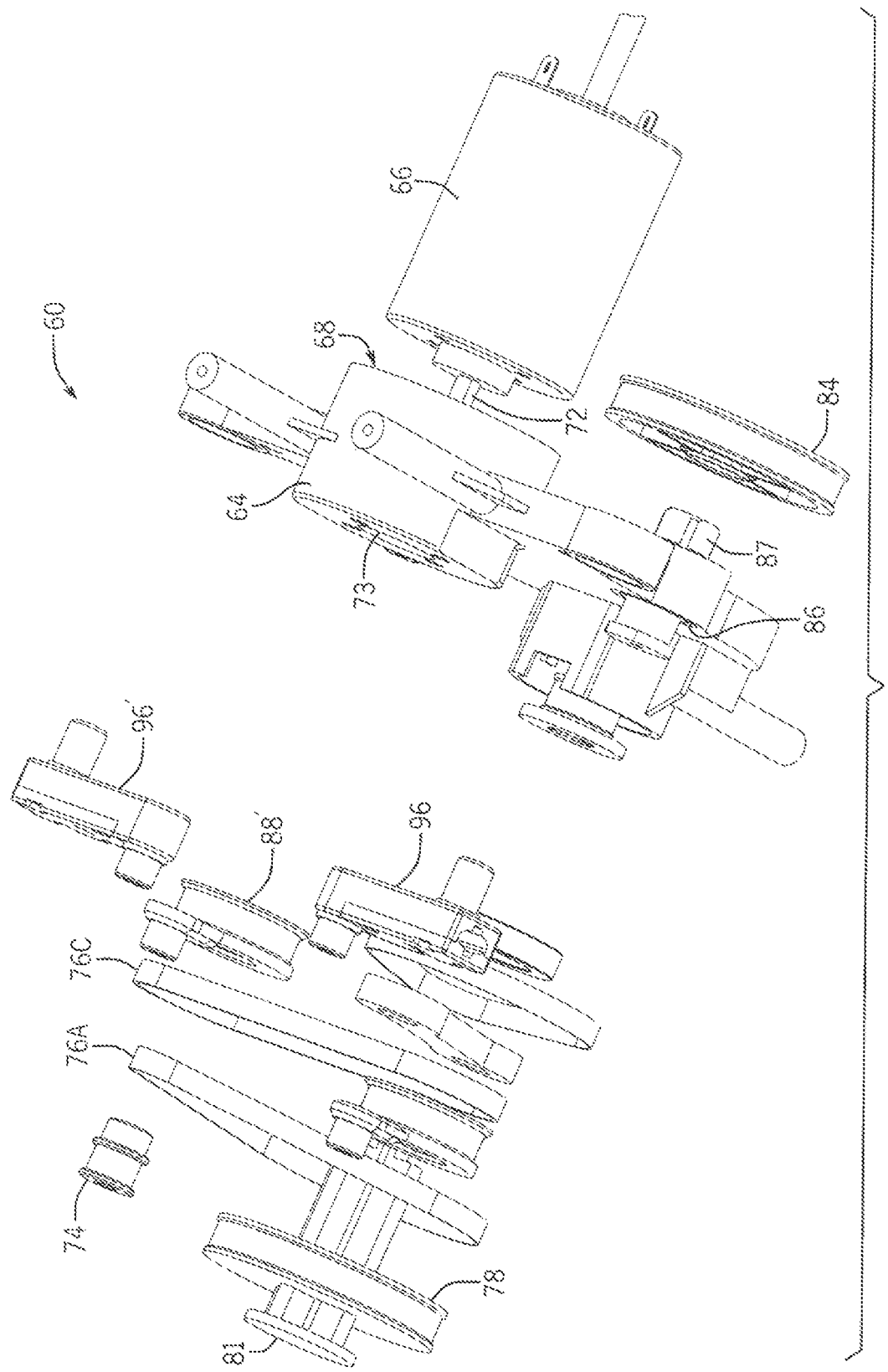
FIG. 18 is a detailed, exploded view (from the side) of the drive assembly components, wherein the left side of the view is disposed toward the front of the decoy in operation.
Figure 19:
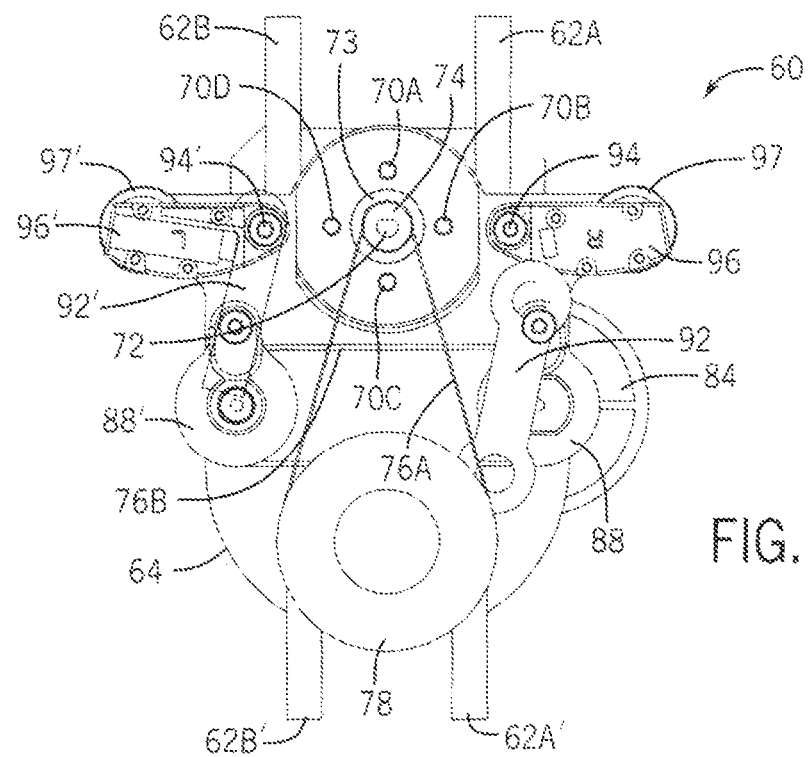
FIG. 19 is a front end view of the drive assembly.
Figure 20:
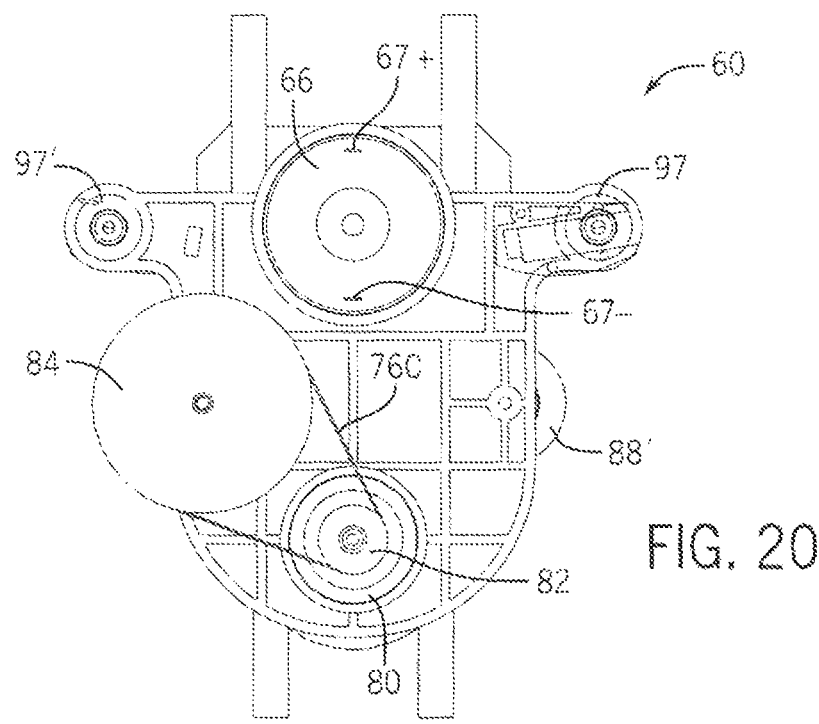
FIG. 20 is a back end view of the drive assembly.
Figure 21:
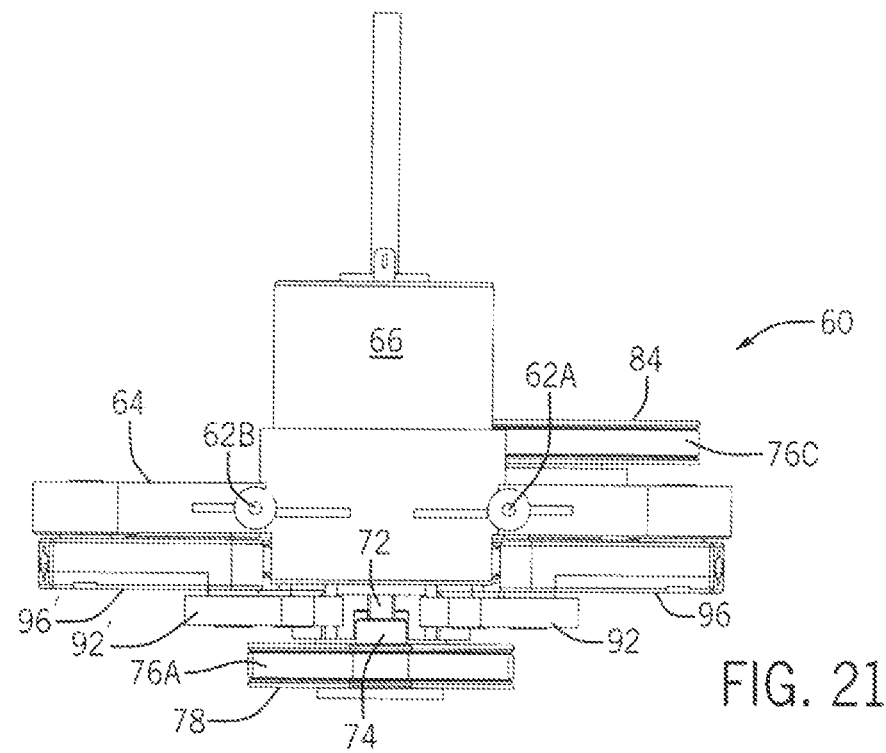
FIG. 21 is a top view of the drive assembly, wherein the bottom of the view is oriented towards the front of the decoy in operation.
Figure 22:
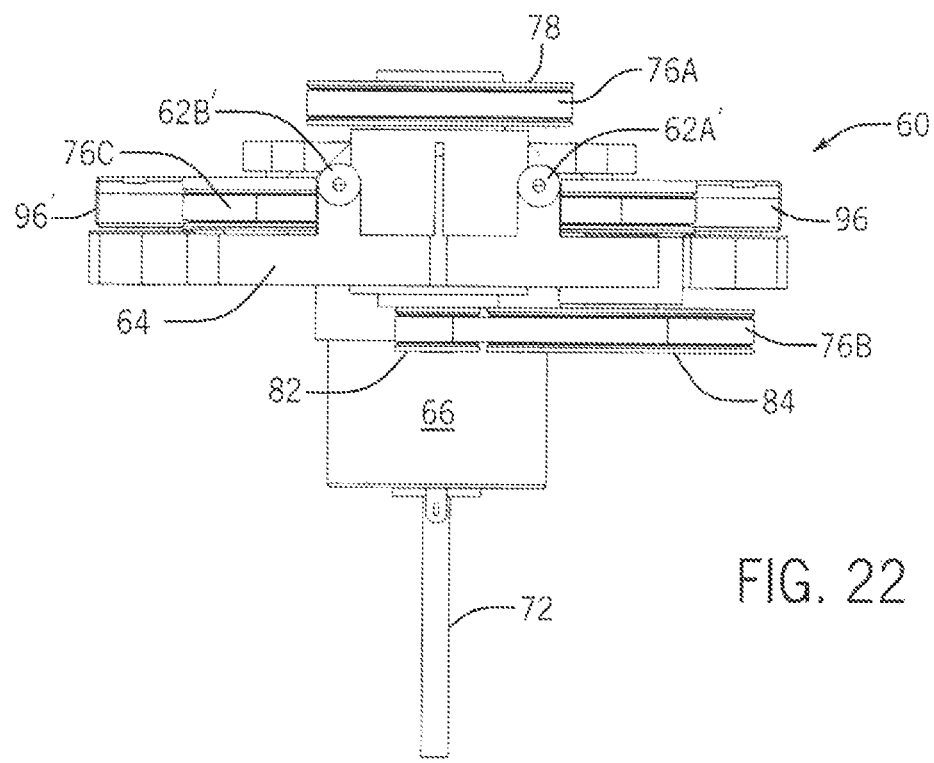
FIG. 22 is a bottom view of the drive assembly, wherein the top end of the view is oriented towards the front of the decoy in operation.
Figure 23:
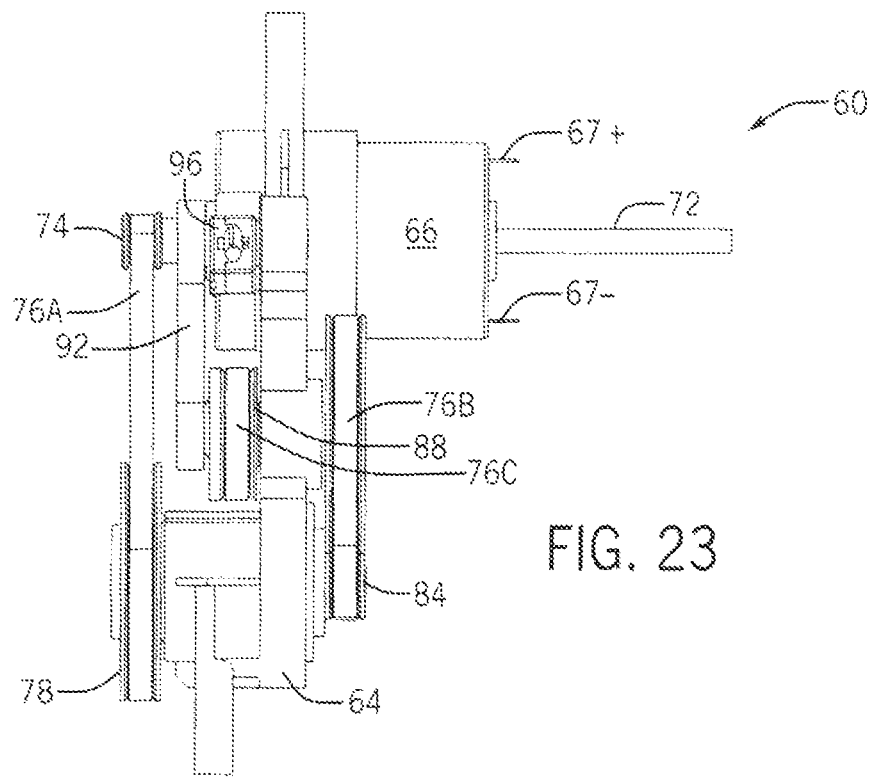
FIG. 23 is a left side view of the drive assembly.
Figure 24:
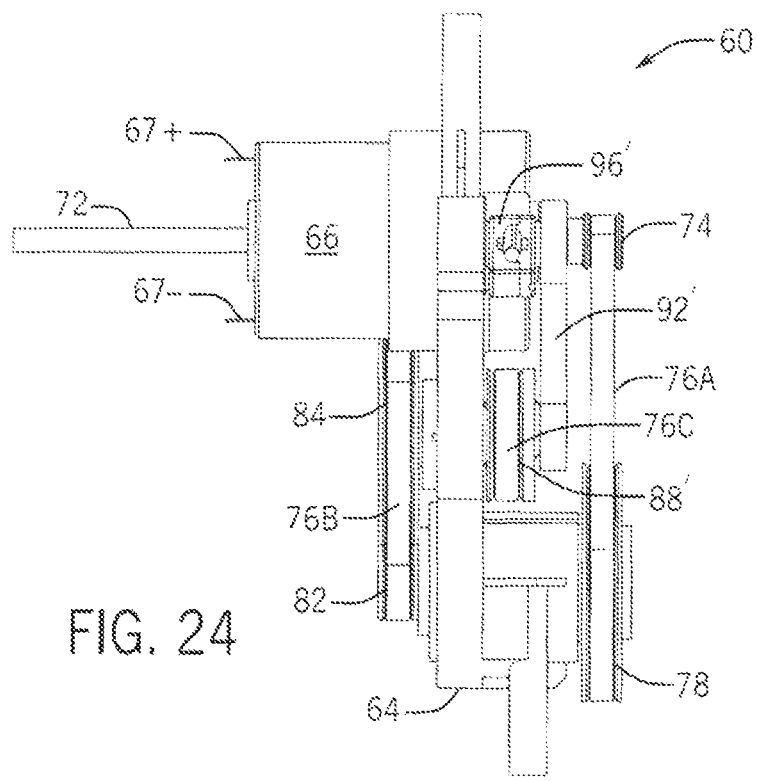
FIG. 24 is a right side view of the drive assembly.
Figure 25:
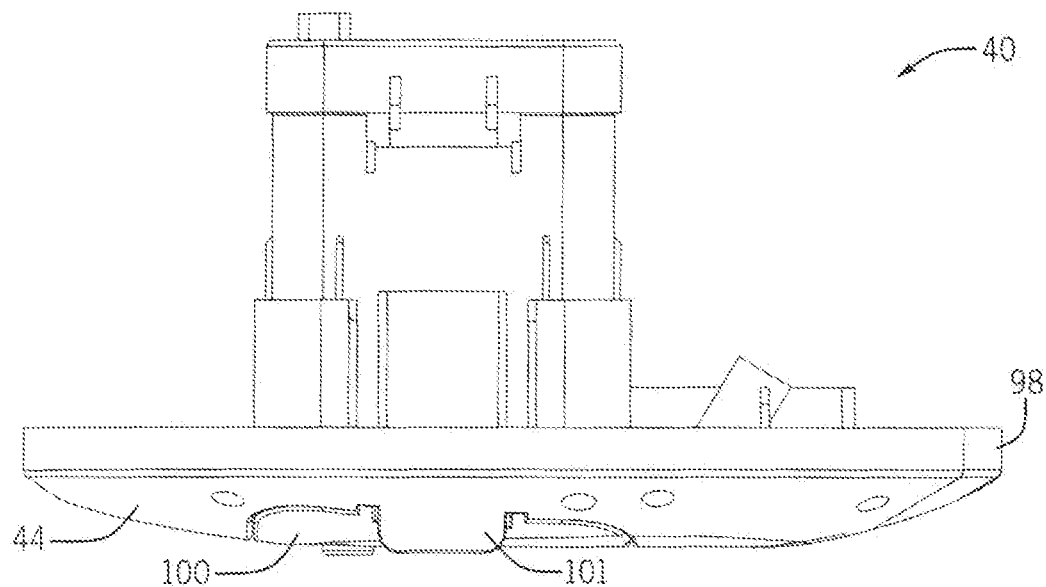
FIG. 25 is a side elevation view of an embodiment of the power and control module.
Figure 26:
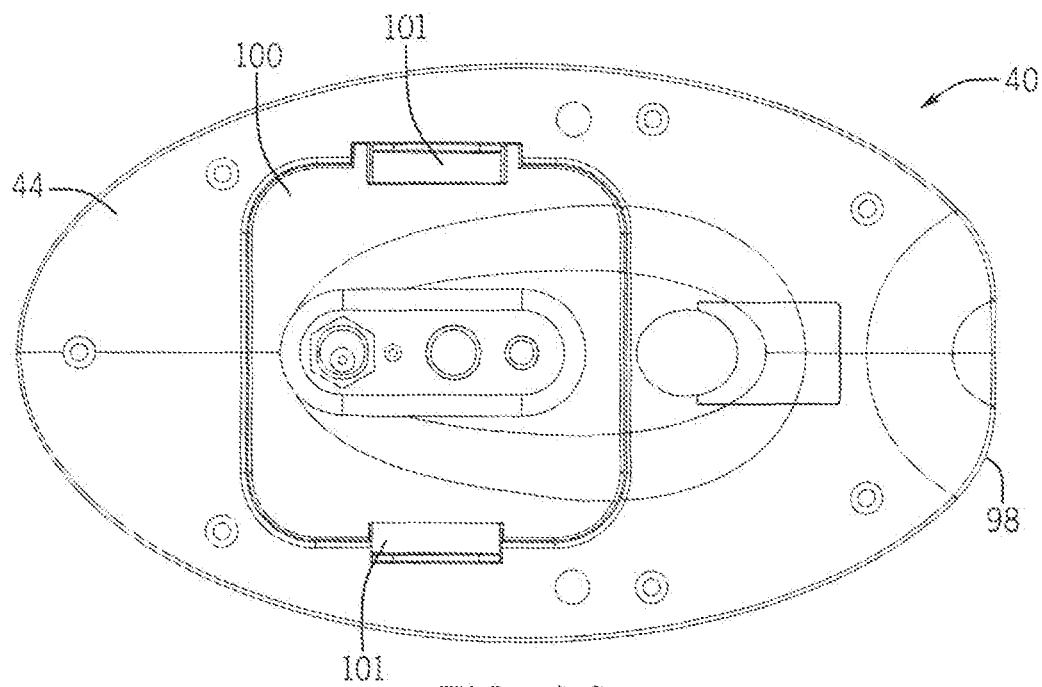
FIG. 26 is a bottom view of the power and control module.
Figure 27:
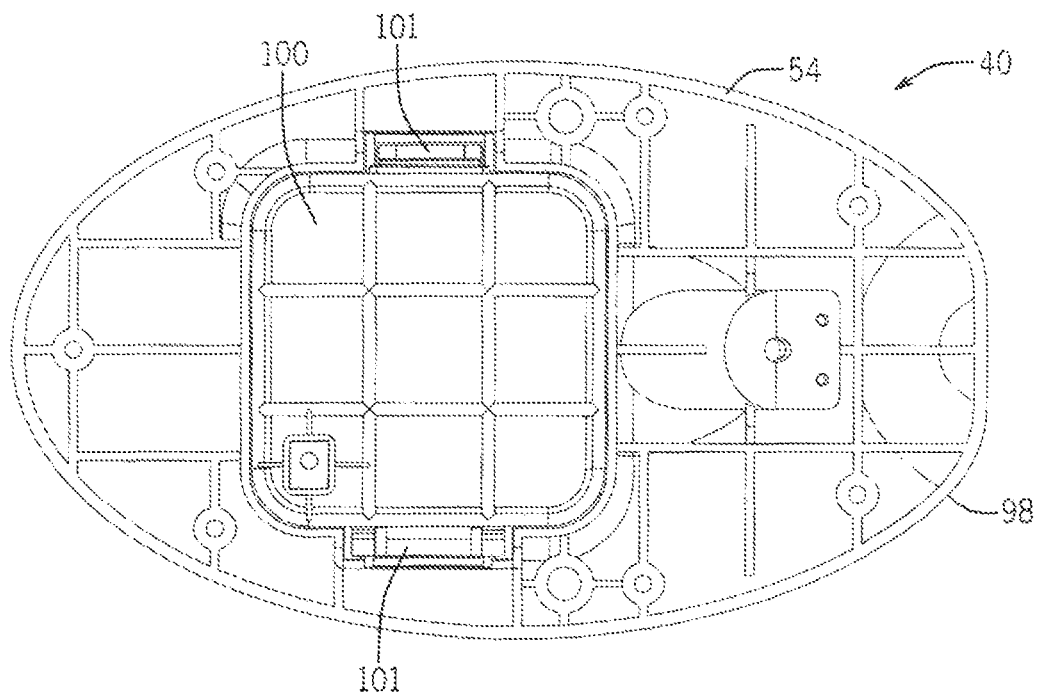
FIG. 27 is a top view of the power and control.
Figure 28:
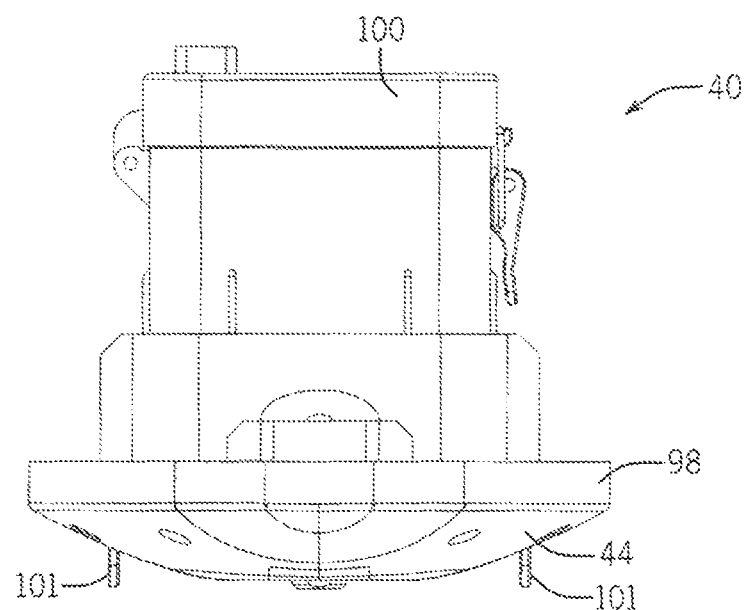
FIG. 28 is a front end view of the power and control module.
Figure 29:
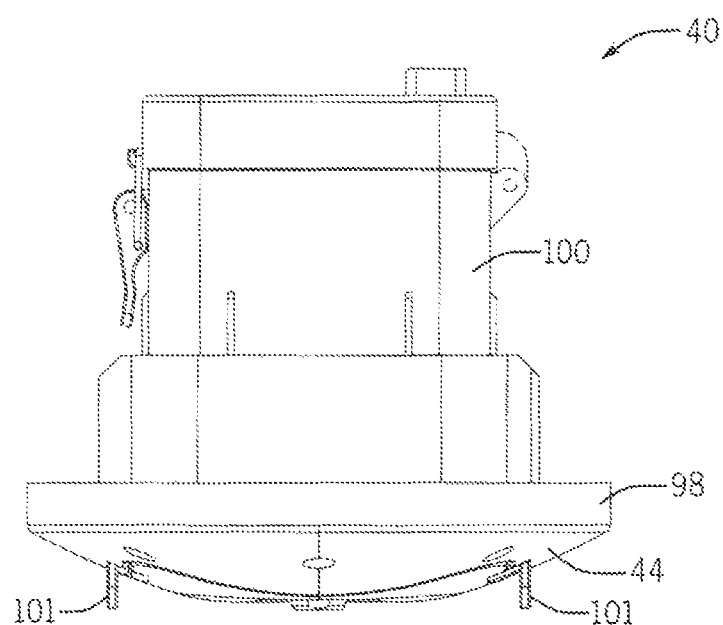
FIG. 29 is a back end view of the power and control module.
Figure 30:
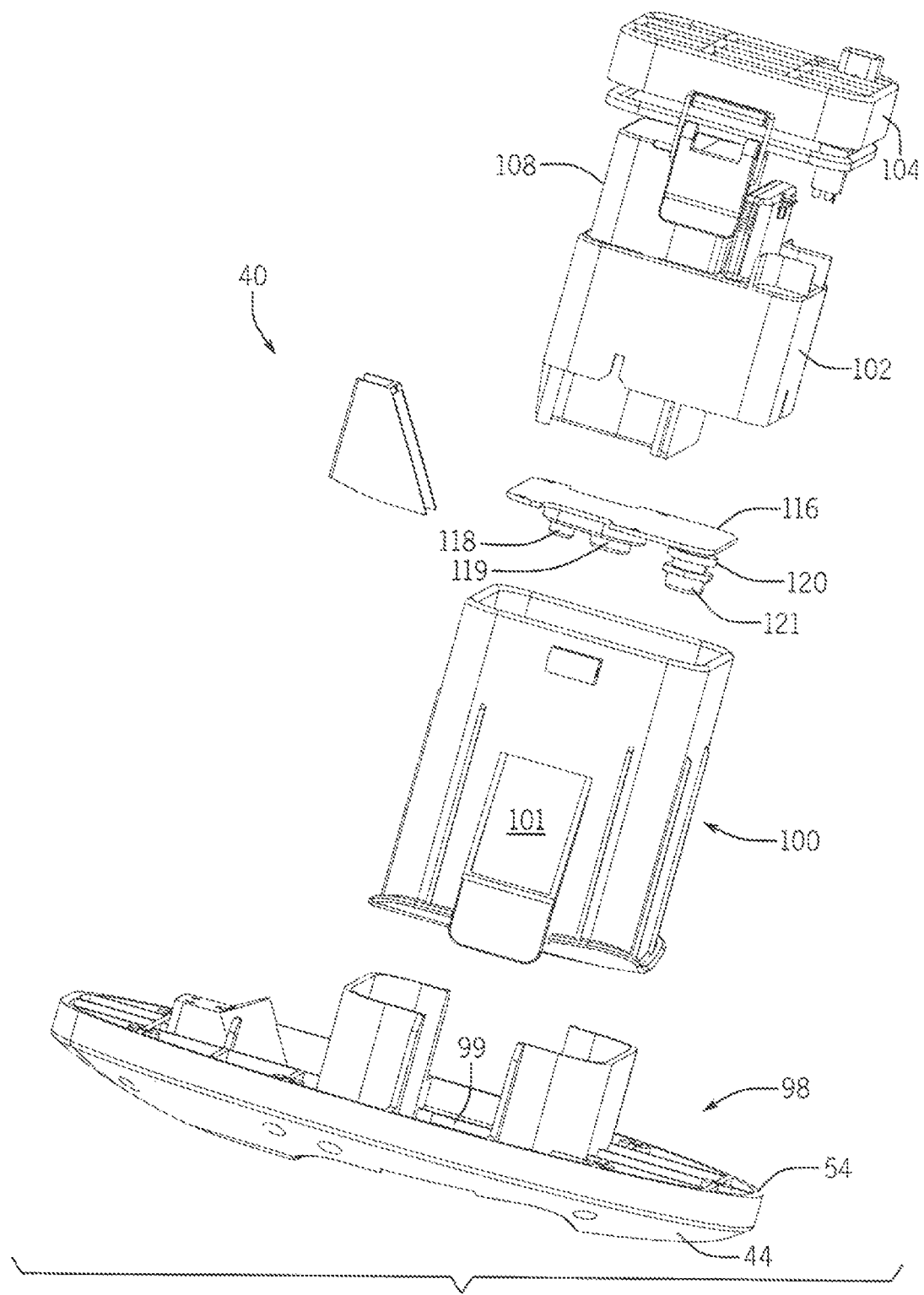
FIG. 30 is an exploded view of the power and control module.

FIG. 1 shows an embodiment of the flapping wing decoy set 10 of the invention. The decoy set includes a decoy 12 and a mounting base 14. The decoy set and decoy simulate a waterfowl, particularly a goose, and most particularly a Canada goose. The decoy 12 is coupled to the base 14 by a friction fit type, insert connection (male base 14, female decoy 12) between the top of the base 14 and the bottom of the decoy 12. Preferably, the set 10 includes a stabilizer 16, most preferably a biased stabilizer cord.

A preferred embodiment of the mounting base 14 is a post or stake which has a vertical member 18 with a bottom and top end 20 and 22, and a horizontal member 24 that forms a T type configuration. The bottom end 20 may be configured as a spike to pierce the earth, for example the submerged bottom of a lake, pond, or marsh. The T type configuration forms a handle at the top of the base 14 to facilitate easier manual pushing during placement and pulling during removal by the user. In this embodiment, the vertical member 18 has a length of approximately 42 inches to permit the decoy 12 to extend above the surface of water so that the decoy 12 mimics the landing behavior of a duck on the surface of water. The vertical member may be mated with one or mom extension members (not shown) to add length (up to 10 feet) for deeper water placement or otherwise changing the appearance of the landing pattern by the decoy 12. The horizontal member 24 has a length of about 5 inches in this embodiment and is disposed a predetermined distance from the top 20 of the vertical member to serve to engage the stabilizer 16 by wrapping as shown. The stabilizer 16 is preferably a bungee-type cord extending in a loop approximately 8 inches in length from the bottom of the decoy 12. In the preferred embodiment, the cord is black in color to simulate the color of the legs of a Canada goose. Other colors can be used depending upon the species and/or sex represented. Thus, the stabilizer 16 functions to hold the decoy 12 securely on the base 16 and also acts as part of the decoy simulation. Although the base 14 is shown and described as a stake type apparatus for mounting in earth, it is within the purview of the invention that the base could be constructed and arranged as a tri-pod or other configuration, provided that it has a T type top end with a male type top 22 connection for the decoy 12, and a horizontal member for engaging the stabilizer 16.

Referring also to FIGS. 2-10, the preferred embodiment of the decoy 12 includes a body 26, a pair of wings 32 A and B, a drive assembly 60 fixedly disposed inside the body 26 in an internal cavity thereof, and a power and control module 40 coupled (removably) to the bottom of the body 26.

The body 26 has a front head section 28 and rear tail section 30. A pair of wings 32 A and B are coupled, in use, to the body 26 and extend from the sides of the body 26. In the preferred embodiment, each wing 32 includes a shaft 34 A and B and a wing panel 36 A and B. The shafts 34 A and B pass through apertures 35 A and B, respectively, to the interior of the body 26. In this embodiment, the shafts 34 are constructed of plastic. The wing panels 36 are preferably curved and have printed ink graphics that simulate the pattern and color of a duck or other bird wing. The panels 36 have a curvilinear periphery of a predetermined configuration to simulate the outline of a bird wing, with a predetermined length (extending away from the body 26) and a predetermined width (from front to back). The shafts 34 are connectable and disconnectible to wing sleeve connectors 96 which are disposed in apertures 35 in the sides of the body 26. Preferably, the wing shafts are magnetically connectable to the sleeve connectors 96 so that they are easily connected and disconnected. The sleeve connectors 96 are connected to the motor assembly 60 which is described further below. Alternatively, it is within the purview of the invention that the shafts 34 may be connected to the body 26 (permanently or removably) and the wing panels 36 may be connectable to those shafts 34 directly by various connections.

As is best shown in FIGS. 2-4, 6, 7, 9 and 10, the preferred embodiment of the body 26 of the decoy 12 is preferably a unitary or one piece structure, but may be formed in interconnected parts (fixed or removable). Significantly, the body 26 is preferably constructed of Ethylene vinyl acetate (EVA) plastic material. This construction permits enhanced, detailed, 3-dimensional surface ornamentation 38 and color. The body 26 is configured in a downwardly arched condition to simulate a live waterfowl or migratory bird, such as a goose, in the act of landing on the surface of a water body such as a lake, pond, marsh, creek or the like. Other configurations are possible utilizing the teachings of the invention. In the embodiment shown, the body 26 has a total longitudinal length of about 26 inches from bill to tail (22 inches from tail to end of torso (beginning of neck)). The thickness or height of the body 26 torso is about 9 inches. The lateral width is a maximum of about 10 inches at the middle of the torso.

Referring to FIGS. 8-19, a preferred embodiment of the power and control (or main) module 40 is removably connected to the decoy body 26 at the bottom thereof. When connected, the module 40 is disposed in a lower body cavity 42. The main module 40 contains power and control elements of the decoy 12 described further below. The body cavity 42 has predetermined dimensions and depth to accommodate the main module 40 so that its lower, exterior surface panel 44 is flush with the exterior surface of the body 26 when connected. The periphery of the module contains eight threaded screw holes 45 A-H for mounting, and the body 26 has eight complementary mounting areas 46 A-H. In the embodiment shown, the cavity 42 has a rectilinear front edge 48 and a curvilinear rear edge 50. The length (longitudinal axis) of the cavity is approximately 9 inches and the width is approximately 7 inches. The edges 48 and 50 and mounting areas 46 are inset from the exterior a predetermined distance, forming a substantially continuous flange-type ridge 32 around the periphery of the cavity 42 opening. A top edge 54 of the module abuts this inset ridge 52 forming a water resistant connection. Significantly, grouping the power and control feature in a removable group as one unit, and disposing that unit at the bottom of the decoy shields the features from elements such as moisture, dirt, dust, grease, and the like so that they last longer, and also permits easy replacement of the features should a failure occur. Mounting the main module 40 on the bottom of the body 26 also permits more realistic surface ornamentation for the upper part of the body, which is the part of the decoy which is most visible to waterfowl which are sought to be attracted by the user/hunter. Bottom placement of the module 40 also minimizes the existence of structural connection lines on the top, which again renders the appearance more lifelike.

FIGS. 11-24 show a preferred embodiment of the drive assembly 60 of the decoy 26. The drive assembly 60 is disposed in the cavity 42 of the body 26. In the preferred embodiment, the drive assembly 60 is separate from the main module 40 in the cavity 42, and is fixedly connected to the body 26 via two sets (prime and double prime) of posts 62 A and B, each with threaded screw apertures, on each side of a mounting bracket 64. The mounting bracket 64 supports a DC motor (preferably 6 Volt but alternatively a 12V) 66, which has a pair of positive and negative power wires 67 (+ and −) that jointly connect to a female power adapter 69 on the main module 40. The motor 66 fits into a mounting slot 68, and is secured to the mounting bracket 64 by screws 70A-D. A driveshaft 72 of the motor 66 protrudes through aperture 73 in the mounting bracket 64 to drive a first (small) toothed gear 74. A first drive belt 76A transfers power to a second (large) toothed gear 78. A bearing and housing 80 enables power to be transferred through an axle 81 to a third (small) toothed gear 82 disposed on the back or rear side of the bracket 64. A second drive belt 76B transfers power to a fourth (large) toothed gear 84. Another bearing housing 86 enables power to be transferred through a second axle 87 to a fifth (medium sized) toothed gear 88 disposed on the front side of the bracket 64. Fifth gear 80 is connected by a third drive belt 76C to gear 88', which is a duplicate of gear 88 and arranged in a side by side orientation on the front side of bracket 64. Bearings 90 and 90' in joints couple connecting rods 92 and 92' to final gears 88 and 88', respectively. One end the rods 92 and 92' are pivotally mounted to the peripheries of gears 88 and 88', respectively, and the other ends of rods 92 and 92' are pivotally mounted, through bearings 94 and 94', to wing sleeve connectors 96 and 96'. The opposite ends of wing sleeve connectors 96 and 96' me pivotally mounted to points on the mounting bracket 64 by bearings 97 and 97', respectively. Thus, by way of this belt drive system, power is smoothly and quietly transferred from the drive shaft 72 of the motor 66 to the wing sleeve connectors 96 and 96,' and ultimately the flapping wings 32 themselves. The use of belts 76A-C facilitates quieter operator at comparable speeds to direct drive mechanisms of the prior art. Furthermore, an oscillating system is formed from the twin gears 88 and 88' to the wing sleeve rods 96 and 96', enabling a simulated flapping motion of the wing shafts 32 A and B once they are inserted into % and 96' respectively. It is within the purview of the invention that the drive assembly 60 may be constructed and arranged as part of the power and control module 40 and therefore removable from the body 26.

Referring also to FIGS. 25-30, the power and control module 40 preferably includes a base member 98, a readily insertable and removable central member 100 with pinch-release tabs 101 that lock with counterpart tabs 99 on the base member 98, a battery/USB housing 102 that is insertable into (flush with the interior surface of) the removable member 100, and an interior hinge cover 104 for the removable member 100. The removable member 100 inserts through the bottom of the base member 98 and is flush with it once fully inserted. Both members are then flush with the bottom surface of the body 26 once the module 40 is attached. The module 40 is water-resistant.

The removable member 100 has three apertures on its lower surface. Two push-type buttons for ON 118 and OFF 119 functions and a charging port 120 protrude through the apertures. The charging port 120 is protected from water damage by a plug 121, preferably attached to a leash secured around the charging port 120. The interior of the removable member 100 has a first printed circuit board (PCB) 116 electrically communicatively connected to the on/off buttons 118&119, and communicably connected to the charging port 120 by positive and negative wires.

The battery/USB housing 102 has a battery 108 with terminals 110+&− (not shown), a second PCB 122, a USB port 124 with a detachable USB software cartridge 126, a female power port 128 that enables power connection to the motor 66, and an antenna 130. The battery 104 is preferably a 6 or 12 Volt rechargeable battery. It is configured for mating with the female power adapter 69 that is connected communicatively to the charging port 120 and both of the PCB's 116 and 122. The second PCB 122 is also electrically communicatively connected to the USB port 124. The software cartridge 126 contains additional software for receiving control signals, for example RF signals, from a remote control device, for example a hand held remote control (not shown). The antenna 130 is connected to the second PCB 122 for remote control reception. The second PCB 122 contains hardware and software for controlling on/off, power, motor control, and related functions.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A decoy set comprising,
a decoy; and
a decoy base adapted to be placed on an environmental surface, the decoy base adapted to hold the decoy in a predetermined position, the decoy being connectible and disconnectible from the decoy base;
the decoy including
a decoy body constructed of a predetermined material, the decoy body being arranged in a predetermined orientation to simulate a bird, the decoy body having a top, a bottom, and an interior cavity,
at least one decoy wing connected to the decoy body, each decoy wing being constructed and arranged to simulate a wing of a bird, a drive assembly including a motor and a belt drive mechanism coupling the motor to the at least one decoy wing,
a power and control module, the power and control module being connectible and disconnectible from the bottom of the decoy body, the power and control module being communicatively connected to the motor;
wherein the at least one decoy wing comprises a pair of flapping wings, each wing including a shaft having a first end for mating with the drive assembly, and a wing panel connected to a second end of the shaft opposite the first end; and
wherein the drive assembly includes a) a mounting bracket connected to the interior cavity of the decoy body for holding the motor in place, b) a first belt coupling a first gear to a second gear, wherein the first gear is connected to a drive shaft of the motor, and c) a second belt communicatively coupling the second gear to a pair of identical final gears, the pair of identical final gears being coupled to each other by a third belt, each final gear being coupled to a drive arm which is connectible to and oscillatingly moves each decoy wing.

2. The decoy set of claim 1, wherein the decoy body is constructed of ethylene vinyl acetate, and wherein the ethylene vinyl acetate decoy body has 3 dimensional exterior ornamentation to simulate a bird.

3. The decoy set of claim 1, wherein the decoy simulates a waterfowl or migratory bird with a pair of flapping wings.

4. The decoy set of claim 1 wherein the power and control module includes a plug and play, USB connectible and disconnectible software module.

5. The decoy set of claim 4, wherein the plug and play software module provides remote control capability.

6. The decoy set of claim 1, wherein the power and control module has a female type connector disposed on the bottom, and wherein the decoy base has a male type connector that, in use, mates with the female type connector of the power and control module.

7. The decoy set of claim 1, wherein the power and control module has a bias type cord adapted to mate with the decoy base to hold the power and control module to the base, the bias cord further simulating the appearance of legs of a waterfowl animal.

8. The decoy set of claim 7, wherein the bias cord is black in color.

9. The decoy set of claim 1, wherein:
   a. the decoy body is constructed of ethylene vinyl acetate;
   b. the decoy is a flapping wing, waterfowl decoy;
   c. the power and control module includes a plug and play software module;
   d. the power and control module has a female type connector disposed on the bottom and wherein the decoy base has a male type connector disposed on top of the base that, in use, mates with a female type connector of the power and control module; and
   e. the power and control module has a bias type cord adapted to mate with the decoy base to hold the power and control module and decoy body to the base, the bias cord further simulating the appearance of legs of a bird.

10. The decoy set of claim 1, wherein the second belt is communicatively coupled to the second gear by a third gear, wherein the third gear is connected to the second gear by a shaft, and the second belt is communicatively coupled to one final gear of the pair of identical final gears by a fourth gear, wherein the fourth gear is connected to the one final gear of the pair of identical final gears by a shaft.

11. The decoy set of claim 10, wherein each drive arm is connected to a periphery of the final gear of the pair of identical final gears.

12. The decoy set of claim 11, wherein each drive arm comprises interconnected first and second drive arms, each second drive arm being pivotally fixed at a distal end thereof to the mounting bracket.

13. The decoy set of claim 10, wherein the power and control module includes a battery communicatively connected to an electronic control circuit, the electronic control circuit further being communicatively connected to the motor.

14. The decoy set of claim 13, wherein the power and control module further comprises a base member for mating with the bottom of the decoy body, and a battery holder connected to the base member.

15. The decoy set of claim 14, wherein the base member further comprises an on/off switch communicatively connected to the electronic control circuit, a battery recharge port communicatively connected to the battery, and a plug and play software module which provides remote control capability.

16. A waterfowl or migratory bird decoy set comprising,
   a powered, flapping wing decoy;
   a decoy base adapted to be placed on an environmental surface, the decoy base adapted to hold the decoy in a predetermined position, the decoy being connectible and disconnectible from the decoy base, the decoy base including a vertical member, a male type connector disposed at a top of the decoy base, and a horizontal member connected to the vertical member a predetermined distance from the top of the vertical member thereby forming a T-shaped handle;
   the decoy including,
      a decoy body constructed of ethylene vinyl acetate with exterior ornamentation to simulate a waterfowl or migratory bird, the decoy body being arranged in a predetermined orientation to simulate a waterfowl or migratory bird, the decoy body having a top, a bottom, and an interior cavity, the interior cavity being open at the bottom to form an access cavity port,
      a pair of flappable decoy wings extending laterally from the decoy body, each decoy wing including a mating shaft and a wing panel connected to the mating shaft, which is constructed and arranged to simulate a wing of a waterfowl or migratory bird,
      a drive assembly disposed in the interior cavity of the decoy body, the dove assembly including a motor and a belt drive mechanism coupling the motor to the mating shafts of the pair of flappable decoy wings, the drive assembly including a) a mounting bracket connected to the interior cavity of the decoy body for holding the motor in place, b) a first belt coupling a first gear to a second gear, wherein the first gear is connected to a drive shaft of the motor, and c) a second belt communicatively coupling the second gear to a pair of identical final gears, the pair of identical final gears being coupled to each other by a third belt, each final gear being coupled to a drive arm which is connectible to and oscillatingly moves each decoy wing, and
      a power and control module, the power and control module being connectible and disconnectible from the bottom of the decoy body at the access cavity port, the power and control module including a battery communicatively connected to an electronic control circuit, the electronic control circuit further being communicatively connected to the motor assembly; and
   whereby in use, the decoy base is placed in a selected position in a hunting environment by a user, the flapping wing decoy is coupled to the top of the decoy base, the decoy wings are coupled to the belt drive mechanism, and the power and control module is actuated to power and flap the wings.

17. A water fowl or migratory bird decoy comprising,
   a decoy body constructed of a predetermined material with exterior ornamentation to simulate a waterfowl or migratory bird, the decoy body being arranged in a predetermined orientation to simulate a waterfowl or migratory bird, the decoy body having a top, a bottom, and an interior cavity;
   at least one decoy wing connected to the decoy body, each decoy wing being constructed and arranged to simulate a wing of a bird; a drive assembly including a motor and a belt drive mechanism coupling the motor to the at least one decoy wing,
   a power and control module, the power and control module being connectible and disconnectible from the bottom of the decoy body, the power and control module actuating the at least one decoy wing;
   wherein the at least one decoy wing comprises a pair of flapping wings, each wing including a shaft having a first end for mating with the drive assembly, and a wing panel connected to a second end of the shaft opposite the first end; and wherein the drive assembly includes a) a mounting bracket connected to the interior cavity of the decoy body for holding the motor in place, b) a first belt coupling a first gear to a second gear, wherein the first gear is connected to a drive shaft of the motor, and c) a second belt communicatively coupling the second gear to a pair of identical final gears, the pair of identical final gears being coupled to each other by a third belt, each final gear being coupled to a drive arm which is connectible to and oscillatingly moves each decoy wing.

18. The decoy of claim 17, further comprising a decoy base adapted to be placed on an environmental surface, the decoy base having a top male connector member adapted to mate with a female type connector member on a bottom of the power and control module and to hold the decoy in a predetermined position, the decoy being connectible and disconnectible from the decoy base.

* * * * *